July 1, 1930. W. R. CLARK 1,769,205
EXTRUSION MACHINE
Filed May 2, 1924 7 Sheets-Sheet 3
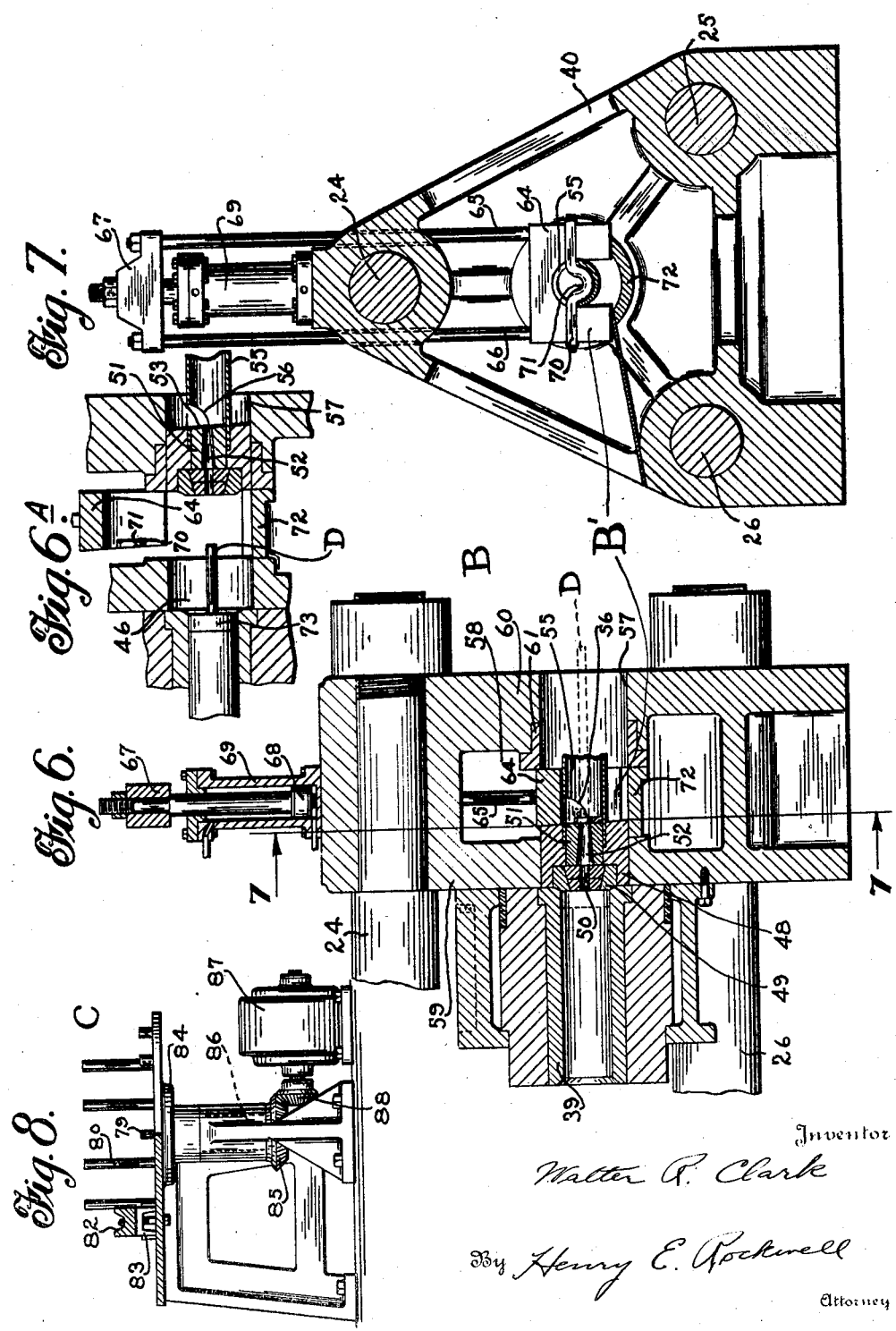

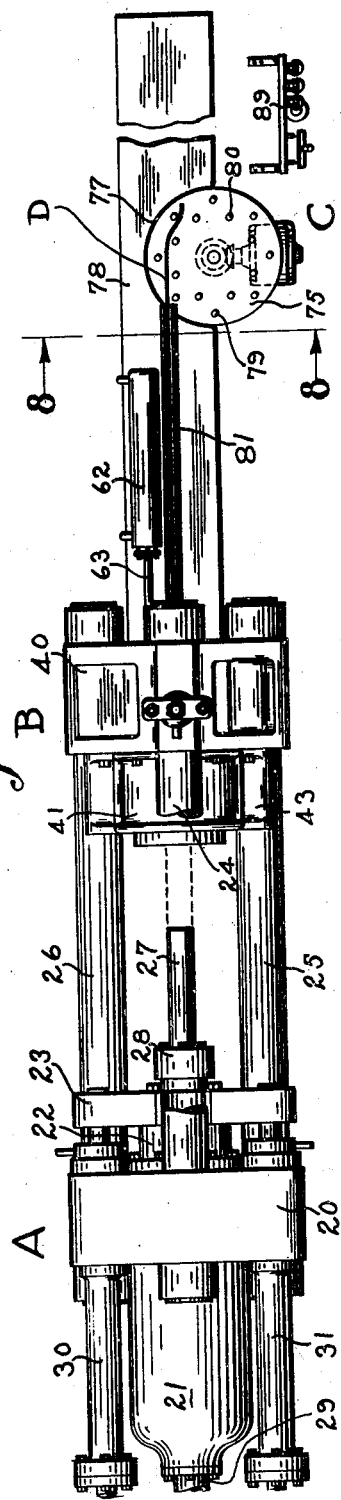

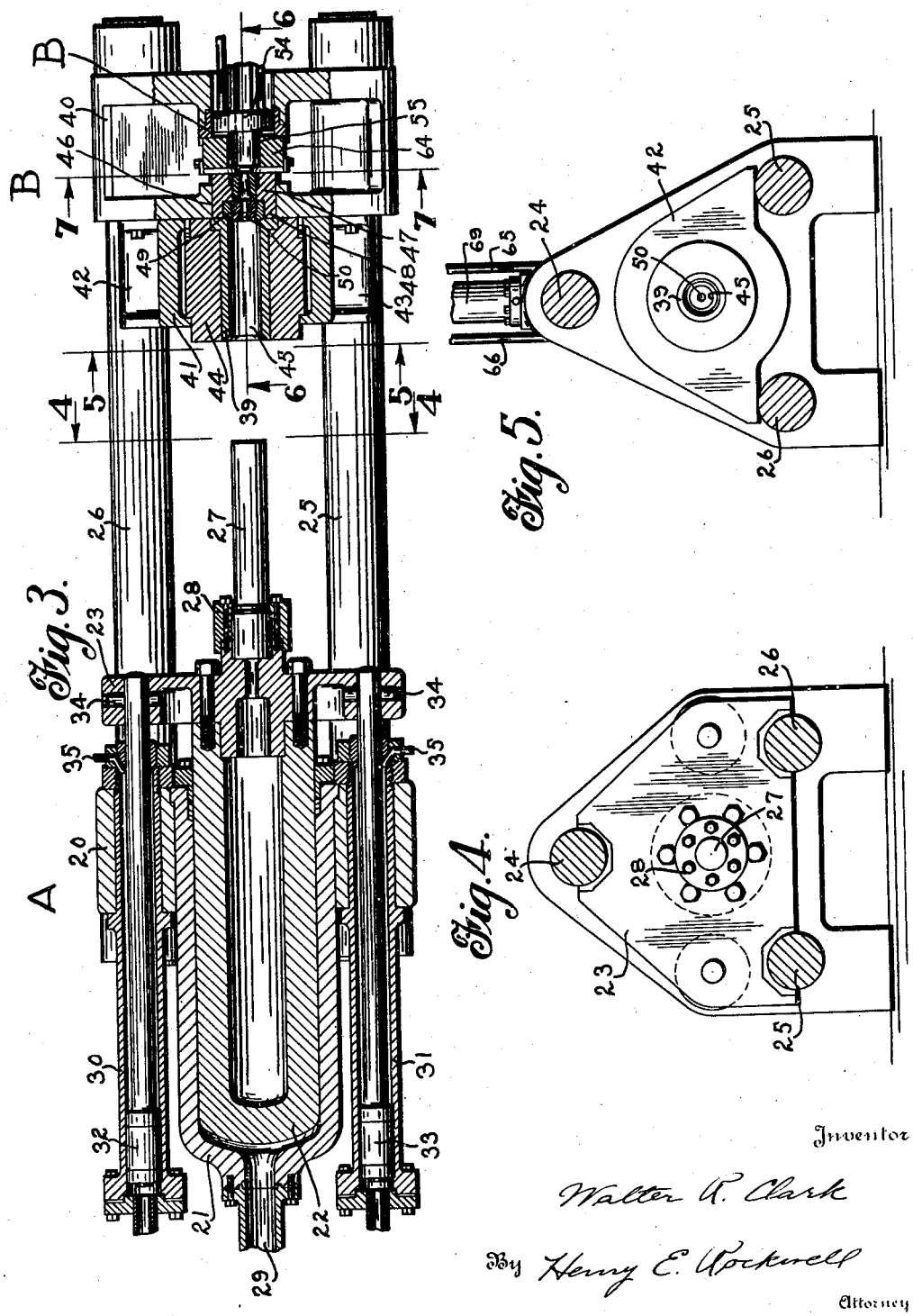

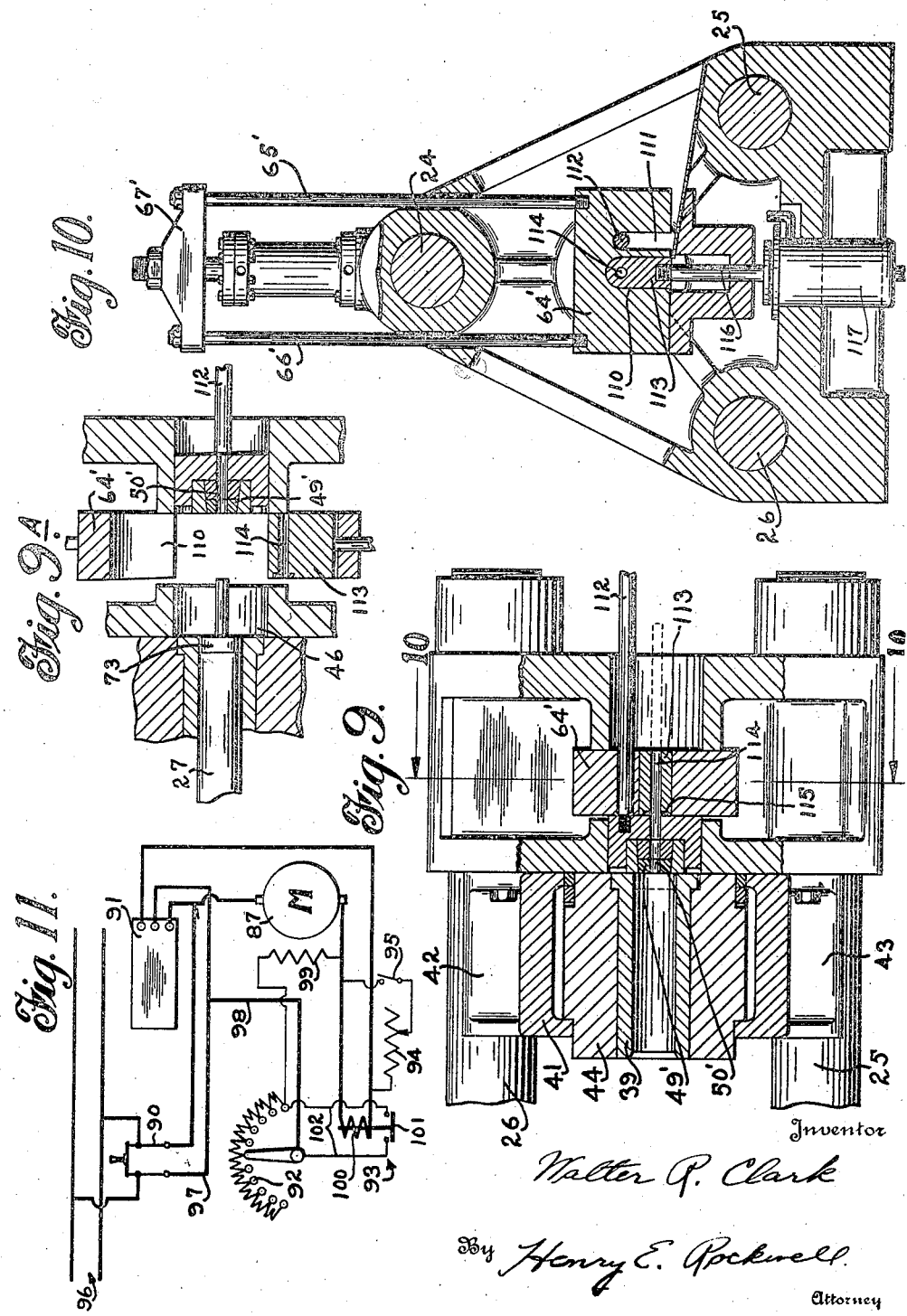

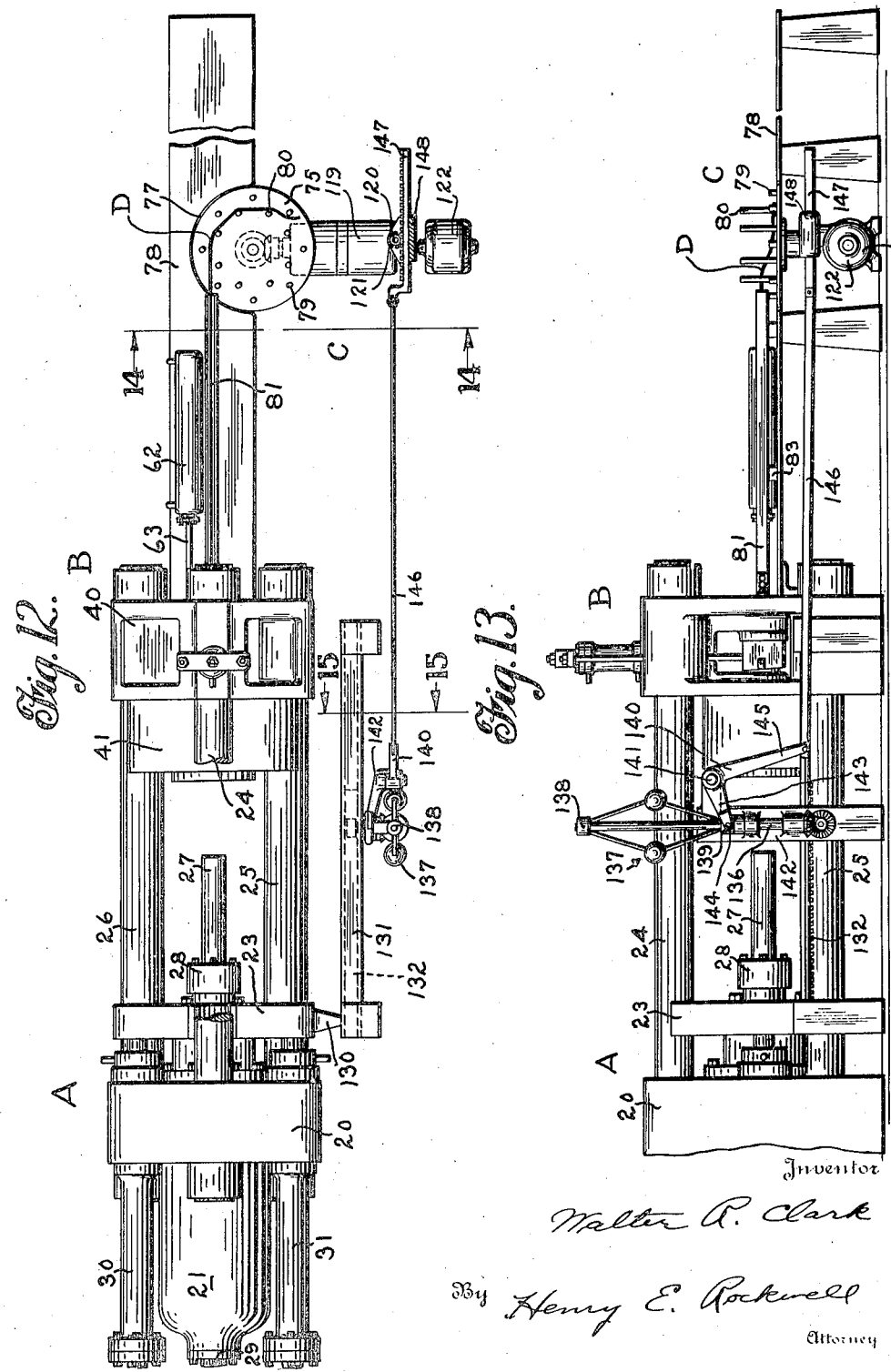

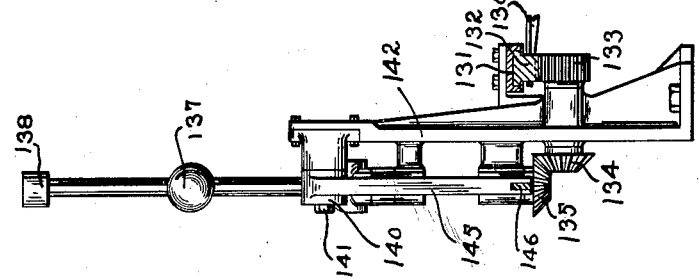
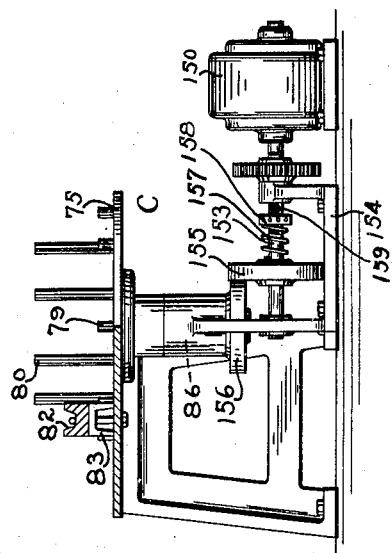
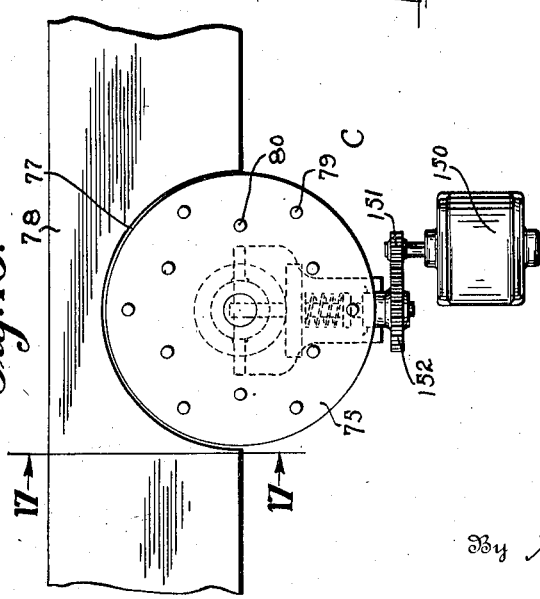
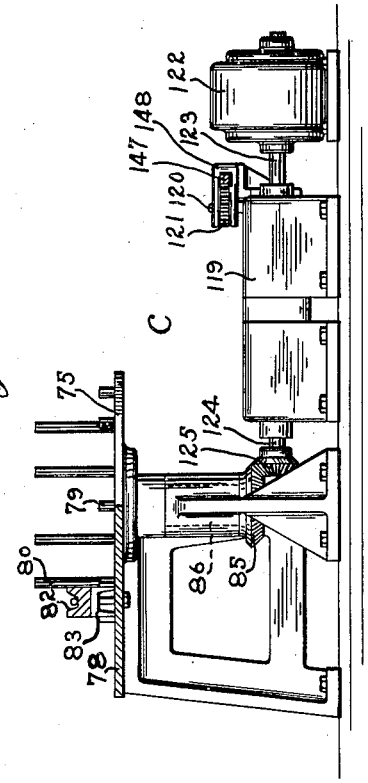

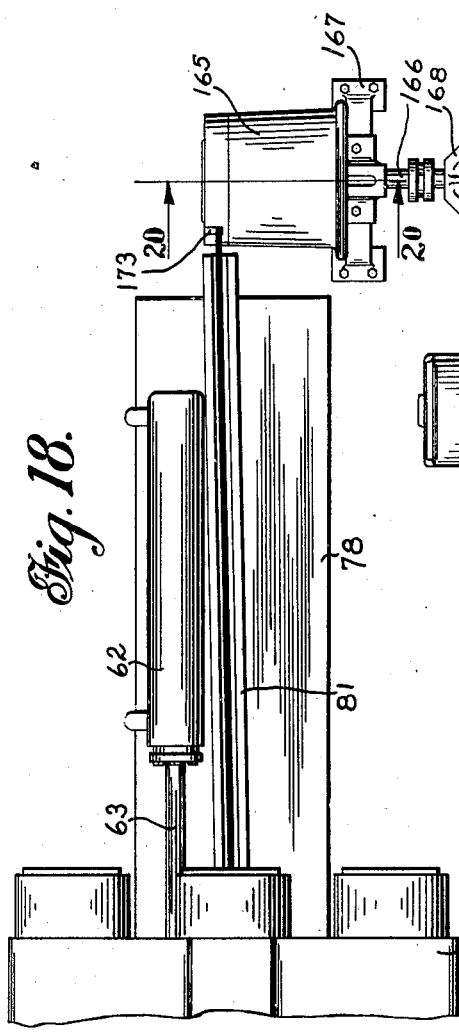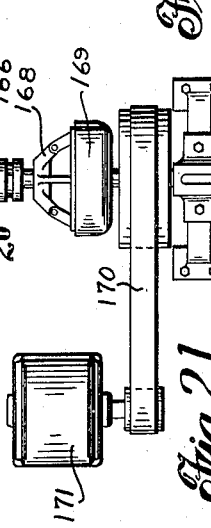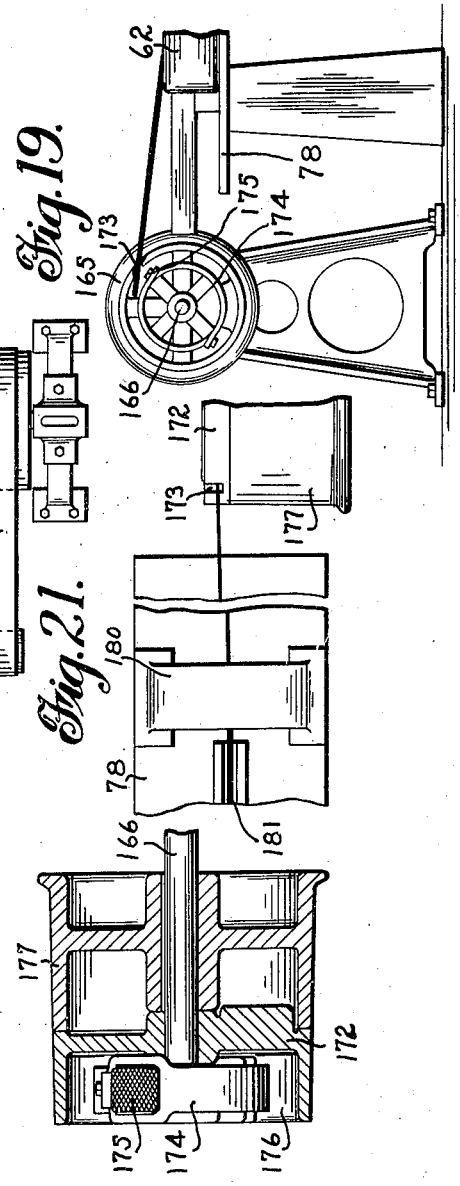

Patented July 1, 1930

1,769,205

UNITED STATES PATENT OFFICE

WALTER R. CLARK, OF BRIDGEPORT, CONNECTICUT, ASSIGNOR TO BRIDGEPORT BRASS COMPANY, OF BRIDGEPORT, CONNECTICUT

EXTRUSION MACHINE

COMPANY, OF BRIDGEPORT, CONNECTICUT

This invention relates to metal extruding machines wherein a heated billet of metal in a plastic condition is inserted into a hollow container, having a die at one end provided with an opening or openings, through which the metal is forced by the action of a power driven ram which enters the other end of the container and presses against the billet until substantially all of the metal of the billet has been extruded, in the form of rods or tubes, through the die openings.

In machines of this type the speed at which the extruded rods or tubes are discharged, the uniformity and density of the metal in the extruded rods, as well as the uniformity in size and surface condition of the same, depend upon the condition affecting the metal of the enclosed billet during the extruding operation, and the handling of the extruded rod directly after extrusion. It is desirable that the entire extruding operation take place before the billet has lost sufficient heat to affect its plastic condition so that substantially all of the metal of the billet will be extruded and the extruded rods will be free from flaws, such as cracks, seams and "pipe" due to cool spots and chilled metal. In order to insure that this result be obtained, a pre-determined ram speed depending largely upon the amount of metal in the billet, and the size and number of the openings in the die is necessary.

When the die is provided with more than one opening, or when only one opening is provided and this opening is comparatively large, the extruded rod or tube is not discharged at too rapid a speed to prevent the proper guiding of the same away from the die by manually operable means, but under the same ram speed when the extruded rods or tubes are of comparatively small diameter, the rapidity of the discharge is much greater, causing considerable difficulty in guiding and carrying the same away from the die. It is especially desirable when extruding rods of a diameter approaching the diameter of heavy wire, that the same be carefully handled immediately after extrusion. This wire or small diameter rod is in a more or less semi-plastic condition as it emerges from the die and, therefore, is easily stretched, buckled, twisted, or otherwise marred or distorted. Pulling or interfering with the discharge by blocking the movement in any way will cause this portion of the wire to be reduced in diameter when pulled or increased in diameter or distorted by back pressure.

Production costs enter largely into the extrusion of rods of small diameter, the rods requiring considerable working after extrusion before they are suitable for shipment. It is difficult to handle a plurality of small diameter rods of varying lengths, especially when they are in the condition as first extruded, being wavy and not particularly straight and more or less flexible. It has been found, therefore, desirable to handle this size of rod in heavy coils when moving the same from one operation to another, such as from pickling to the rolling or sizing machines and from there to the straightening machines.

The principal object of my invention, therefore, is to provide an extrusion machine which is adapted to extrude metal through dies having a small opening or openings, at such a speed that substantially all the metal contained in the heated billet is formed into a rod, rods or tubes of small diameter before the billet loses its heat sufficiently to allow the billet to cool and solidify enough to interfere with the physical makeup of the extruded rod, etc., and to carry the extruded rods or rod away from the die as rapidly as the same are discharged therefrom.

Another object of this invention is to provide a machine of the character which will guide and carry away from the die the extruded rods or other blanks as the same are extruded, in such a manner that the surface of the rods will not be distorted.

Another object is to provide a machine of this character which will dispose of the extruded rods as the same are extruded, in such a manner that the rods will be wound into coils for convenient handling between subsequent operations incident to the manufacture of completed rods or wire.

Another object is to provide, in extrusion machines of this character, means to carry away an extruded rod as rapidly as the same is discharged from the die of the machine and to accomplish this result by mechanism that will develop a constant pull upon the rod, regardless of the rapidity of the discharge.

Another object of this invention is to provide means for winding a rod or wire, when discharged from an extruding machine of this character, into a coil by the use of mechanism that will develop a constant pull upon the wire or rod of sufficient force to keep the same taut as it is discharged from the die, regardless of the speed at which the same is discharged.

Another object of this invention is to provide means for winding a rod or wire, when discharged from an extruding machine of this character, into a coil by the use of mechanism that will develop a constant pull upon the wire or rod of sufficient force to uniformly stretch the wire or rod as it emerges from the die so as to reduce the diameter thereof substantially uniformly throughout its length.

Still another object of this invention is to generally improve extrusion machines of this character so that the same will properly operate when extruding rods of comparatively small diameter, especially when the rapidity of discharge is comparatively great, to increase the production of such rods while maintaining uniformity in density, size and physical makeup of the extruded rod, rods or tubes.

To these and other ends the invention consists of the novel features and combination of parts to be hereinafter described and claimed.

In the accompanying drawings:

Fig. 1 is a plan view of an extruding machine, embodying the principles of my invention;

Fig. 2 is a front view of the same;

Fig. 3 is a cross section on line 3—3 of Fig. 2;

Fig. 4 is a cross section on line 4—4 of Fig. 3;

Fig. 5 is a section on line 5—5 of Fig. 3;

Fig. 6 is an enlarged section on line 6—6 of Fig. 3;

Fig. 6$^A$ is a section similar to Fig. 6, showing the parts in another position of operation;

Fig. 7 is a section on line 7—7 of Fig. 3 and Fig. 6;

Fig. 8 is an end view of the winding mechanism shown in Figs. 1 and 2, looking in the direction of arrows 8—8 of Fig. 1;

Fig. 9 is a transverse section through the die end of an extrusion machine, showing a somewhat modified form of rod cut off;

Fig. 9$^A$ is a vertical section of the same parts shown in another position of operation;

Fig. 10 is a vertical transverse section on line 10—10 of Fig. 9;

Fig. 11 is a diagrammatic layout showing the connections of the various electric devices used in the form of winding mechanism illustrated in Figs. 1, 2 and 8;

Fig. 12 is a plan view of an extrusion machine equipped with a somewhat modified form of winding mechanism;

Fig. 13 is a front view of the same;

Fig. 14 is a section on line 14—14 of Fig. 12, showing a side view of the winding mechanism;

Fig. 15 is a section on line 15—15 of Fig. 12, showing a side view of other portions of the winding mechanism;

Fig. 16 is a plan view of still another form of winding mechanism adapted for use with an extrusion machine of this character;

Fig. 17 is a side view of the same;

Fig. 18 is a plan veiw of another modified form of winder;

Fig. 19 is an end view of the winding mechanism, shown in Fig. 18;

Fig. 20 is a section on line 20—20 of Fig. 18, and,

Fig. 21 shows a reducing device or die adapted for interposition between the extrusion die and the winder for effecting further reduction of the rod or other extruded product.

The extruding mechanism shown in the accompanying drawings as an example of an appropriate form for carrying out the invention, comprises a power driven ram mechanism A, and a stationary billet container and die supporting unit B provided with extruded rod severing means B'.

The ram driving mechanism consists of a frame 20, to which is suitably secured a cylinder 21 in which a piston 22 is operated, usually by hydraulic pressure, to reciprocate a crosshead 23. The crosshead 23 is mounted to slide upon tie rods 24, 25 and 26, which serve to guide and support the crosshead as well as to tie the frame 20 to a corresponding frame member 40 of the die supporting unit B. Facilities for retaining a ram 27 are provided upon the crosshead at 28. The piston 22 is directly operated by pressure only on the working stroke of the ram, the fluid pressure being released at the return stroke by the manipulation of suitable valve controls (not shown), which connect the inlet and outlet port 29 with an exhaust. On another working stroke, pressure is applied by a reverse action of the controls allowing fluid under pressure to enter through port 29 into the cylinder 21, and to operate against the piston 22, forcing the crosshead 23, and therefore the ram 27 forward. To return the crosshead and ram after a completed working stroke, a pair of high pressure cylinders 30 and 31 is provided one on either side of the main cylinder 21, the pistons 32 and 33 operating therein being connected to the crosshead 23 by suitable means, such as pins 34. Fluid controlling valves (not shown), are operated to cause fluid under pressure to enter the cylinders 30 and 31 through a bore 35, provided in each cylinder, which pressure acts against the respective pistons 32 and 33 to return the same, and consequently the crosshead and ram, into the proper position for another working stroke. Usually the return stroke, due to the high pressure used, is more rapid than the working stroke.

The stationary billet container and die supporting unit B comprises the frame member 40, to a face of which is secured a billet container 41, and a die holder 47. The billet container 41 is provided with lateral extensions 42 and 43, which rest upon the tie rods 25 and 26 and support the container thereon. The billet container consists of an outer casing in which is mounted a removable cylinder 44, having a bore 45 therethrough. As shown in the drawings, the cylinder 44 is lined with a sleeve member 39, usually of steel. The bore 45 of the billet container is in direct alignment with the ram 27. The frame member 40 is provided with an opening 46 in which the die holder 47 is slidably mounted. The die holder 47 has a forward portion 48, adapted to hold a die 49 in abutment with the container cylinder 44 in such a manner that the bore 45 is closed thereby. As shown in the drawings the die 49 is provided with only one opening 50, but obviously more than one may be provided if desired. The forward portion 48 of the die holder 47 is provided with a hardened steel bushing 51, having a tapered opening 52 therethrough forming a shearing edge 53 at the rear end thereof, for a purpose to be hereinafter described. This forward portion 48 is connected to a rear portion 54 by means of a tubular member 55, which is cut away at 56 for a purpose to be described hereinafter. The rear portion 54 is slidable in a continuation 57 of the opening 46.

The frame member 40 is also provided with a cored out opening 58 which divides the frame into two portions 59 and 60, through which the openings 46 and 57 respectively extend, the inner end of the portion 60 being preferably reinforced by a steel bushing 61. A suitable mechanism, such as a cylinder 62 in which a piston having a piston rod 63 is operated by fluid pressure or the like, is provided for moving the die holder. The piston rod 63 is connected to the rear portion 54 of the die holder and when reciprocated by movement of the piston in the cylinder 62 either withdraws the complete die holder and die away from the container or forces the same toward the container.

Located between the forward portion 48 of the die holder and the steel bushing 61 is a die backing block 64, operatively connected by rods 65 and 66 and a cross-bar 67 to the piston 68 reciprocable in the cylinder 69 by fluid pressure. The die backing block 64 is arranged to straddle the tubular member 55 and by its wedge shape forces the die into close contact with the container being supported in the rear by the bushing 61, located in the frame portion 60. A severing tool 70 extends across the face of the block 64, and is located adjacent the forward portion of the die holder 47. This tool is looped downwardly at the center, in alignment with the die opening and at this point is provided with a beveled edge 71 so as to present a cutting edge which will co-operate with the hardened steel bushing 51 to sever the extruded rod when the die backing block 64 is raised, by action of the piston 68 to release the die holder, the cut away portion 56 of the tubular member 55 being located to avoid interference with the side extensions of this tool. In order to close the opening between the frame portions 59 and 60 and to provide an uninterrupted bearing for the die holder in its sliding movements, a bearing member is provided beneath the same, as at 72.

The operation of the combined mechanisms so far described, is as follows:

A billet of metal heated sufficiently to be in a plastic condition, is inserted into the billet container, when the parts of the machine are in the position shown in Fig. 3. Fluid pressure is then applied to the cylinder 21, which forces the piston 22 and therefore the ram 27 against the end of the billet. Extrusion of a rod D through the opening in the die starts at this time, the extruded rod flowing through the tapered opening in the hardened steel bushing 51, tubular member 55, and from there away from the end of the machine. When the extruding operation reaches the point where no more action can take place, due to the cooling of the billet, or when sufficient rod has been extruded, the fluid pressure is released from the cylinder 21 and fluid pressure is applied to the cylinder 69, which acting upon the piston 68 raises the backing block 64, as in Fig. 6ᴬ. This action severs the extruded rod at the juncture between the edge 71 of the severing tool 70 and the hardened bushing 51, the remaining stump 73 of the billet, with a small portion of the rod being left in the machine. Fluid pressure is then applied to the piston 62 which draws the die holder away from the container as in Fig. 6ᴬ. By further movement of the ram at this time, the stump 73 is forced from the container and drops out of the machine. The die holder is then moved into position again by a reverse operation of the piston in cylinder 62, the backing block is moved downwardly into position to force the die holder in place and to insure a tight contact of the same with the container end. At the same time, the ram has been returned by means of the operation of the high pressure cylinders 30 and 31, and the machine is then in position to receive and operate upon another billet.

The modified form of cut off mechanism illustrated in Figs. 9, 9<sup>A</sup> and 10 consists of a die backing block 64' having portions cut away as at 110 and 111, the opening 111 being merely a clearance opening for the die holder retracting rod 112, which may be operated by a piston similar to the one controlled within cylinder 62. The opening 110, however, is provided to allow a rod cut off die 113 to pass upwardly therethrough into proper position so that the opening 114 therein aligns with the opening 50' of the extruding die 49'. A hardened steel ring 115 may be provided in the cut off die if desired. A piston rod 116 is connected to the cut off die 113 and is operated upon by means of a piston (not shown), reciprocable in a cylinder 177. The die backing block 64' is raised by similar means, as previously described regarding the backing block 64, comprising a piston operated crosshead 67' having rods 65' and 66' connecting the same with the block 64'. The cut off die 113 is drawn downwardly after the extrusion operation is completed, which motion cuts off the extruded rod leaving a short portion attached to the stump 73, as shown in Fig. 9<sup>A</sup>. The backing block is then raised and the die drawn rearwardly as above described regarding the preferred form, and as shown in Fig. 9<sup>A</sup>.

Although the preferred cut off mechanism illustrated in Figs. 6, 6<sup>A</sup> and 7 and the modified form shown in Figs. 9, 9<sup>A</sup> and 10 are of such construction that they are adapted for rapid operation in order that the rod being extruded will not be retarded so as to interfere with the proper operation of the winding mechanism, which continues to operate to coil up all of the extruded rod after the same is cut from the stump, the preferred form is arranged to sever the rod simultaneously with the raising of the die backing block 64, and the modified form is arranged to cut off in advance of such movement. The pistons and cylinders controlling both mechanisms are operated by fluid under high pressure to cause a rapid movement thereof, and the cutting edges of the severing tools are located in close relation to the rod so that only a comparatively small amount of travel is needed to shear the rod.

As previously pointed out, if the extruded rod is allowed to move away from the machine without being properly controlled, various conditions may arise causing distortion of the same. It is desirable, therefore, especially when rods of small diameter are to be extruded, to provide means whereby the rod or rods will be controlled in the movement away from the die and that this means be capable of efficient action regardless of the rapidity of such discharge. This means must be adapted to act upon the extruded rod to effect a constant and uniform pull away from the die sufficiently strong to take up any possible slack that might develop.

The winding mechanism shown at C, Figs. 1, 2 and 8, illustrates one form of mechanism that will accomplish the objects above noted as desirable in order to properly control the extruded rod directly after the extruding operation, and consists of a disk-like rotatable table 75, mounted upon a standard 76 to rotate within an opening 77 formed in a stationary table 78. The rotatable table 75 is provided with two rows of rod engaging pins arranged in parallel circles and extending upwardly from the table, 79 designating the short outer ones and 80 the long inner ones. A guide 81 having a V-shaped groove 82 therein, extends from a suitable location adjacent the discharge end of the extruding machine and is supported upon the table 78 in any suitable manner, such as by posts 83. The rotatable table 75 is secured to a plate 84 which is operatively connected to a bevel gear 85 by a vertical shaft 86. A shunt wound variable speed electric motor 87, having a bevel gear 88 secured upon the armature shaft, is located in proper position to allow operative engagement of the gears 85 and 88. The extruded rod D will be guided by the grooved guide 81 toward the pins 79 and 80 which, by being rotated by the motor 87, will engage the extruded rod and wind the same into a coil, after which it may be removed as a coil and easily carried to other machines where subsequent operations are performed, such as annealing, rolling, straightening, etc.

The motor 87 is positively and automatically controlled so that it constantly creates a uniform pull upon the extruded rod regardless of the rapidity of discharge of the same from the die. In the particular form shown, certain motor control devices are mounted upon a panel board 89 which is located in a convenient place as illustrated in Fig. 2. In Fig. 11 the connections between the various appliances are diagrammatically shown. The motor control devices may consist of a knife blade main switch 90, a group of motor starting relays 91, a field rheostat 92, a field rheostat relay 93, and a variable resistance 94, the latter having a controlling switch 95. Referring to Fig. 11, electrical energy is supplied from suitable conductors or mains 96 and flows through the main switch 90 to the conductor 97, which is connected to the motor starting relays 91. A branch 98 leads from the conductor 97 to the field rheostat 92 which is operated to control the field 99 of the motor 87. The field rheostat relay 93 comprises a solenoid 100 which is in series with the armature circuit and which actuates a plunger switch 101 controlling a circuit 102, which short circuits the field rheostat 92. The variable resistance 94 is arranged to act as a shunt circuit around the solenoid 100 and therefore acts as a variable control for the operation of the plunger switch 101.

The field rheostat 92 is set to control the field 99 so that the motor 87 will develop a predetermined torque and act upon the winder to maintain a constant pull upon the extruded rod of predetermined strength. Fluctuations in the load will automatically be compensated for by the action of the field rheostat relay 93. For instance, an overload will tend to cause the armature to slow down which will increase the flow of current in the armature circuit. The relay 93, by means of the variable resistance 94 is set to be inoperative under certain current strength but operative whenever an increase in this current occurs. Thus, the action of the armature slowing down under overload will operate the relay 93, whereby the plunger switch 101 will be raised to close the circuit 102. This will give a full current strength to the field 99 whereby the motor immediately tends to reduce in speed, which will cause a decrease in the current flowing through the armature. The reduction of current in the armature causes a reverse action to take place, reinserting the rheostat 92 into the motor field circuit. In practice the relay 93 is constantly working to maintain a constant motor torque. During the first part of the extruding operation the motor speed is relatively faster than at the latter part of the extruding operation when the load or pull, due to the slowing up of the movement of the extruded rod as the billet temperature drops, increases, but as is obvious from the above description the appliances compensate for this increased load by proportionally reducing the speed of the motor so as to develop a constant torque and maintain a constant pull upon the extruded rod at all times, regardless of the rapidity of its discharge.

Figs. 12 to 15, inclusive, illustrate a modified form of winding device wherein the rotation of the table 75 and the tension exerted upon the extruded rod is controlled by a speed control device 119, generally known as a hydraulic variable speed gear. The patent to R. Janney, No. 924,787, dated June 15, 1909, fully describes a gear of this type. The device 119 is usually provided with exterior controlling means which, in this instance, consists of a rotatable shaft 120. A hand wheel is usually secured to this shaft for manual operation of the device, but for the purposes of this invention the hand wheel has been replaced by a spur gear 121. An electric motor 122 is connected directly to the driving shaft 123 of the device 119, and the driven shaft 124 of said device is provided with a bevel gear 125, which meshes with the bevel gear 85, secured upon the shaft 86, operatively connected to the table 75.

As will be noted from the above patent, the variable speed gear 119 is controllable through its interior mechanism so that a constant speed will be produced for the driven shaft 124 by suitable operation of the controlling shaft 120. This gear, therefore, may be set to develop a certain speed for its driven shaft which, under ordinary conditions, will be the proper speed to operate the table 75 efficiently. As the rapidity of discharge for the extruded rod is dependent upon the speed of the forward movement of the ram, which at the first part of the stroke is faster than at the finish of the stroke, it is necessary to provide means for controlling the speed gear 119 to compensate for this difference in ram speed. The mechanism for such speed gear control comprises a suitable bracket 130 secured to the crosshead 23, this bracket having a rack 132 connected thereto which is slidably supported in a guideway 131. The rack 132 during its reciprocating movement, due to the movement of the crosshead 23, operates a spur gear 133 fixed on the shaft of a bevel gear 134, which is in mesh with another bevel gear 135. The bevel gear 135 is secured upon a vertical shaft 136. A centrifugal governor 137 is mounted upon the vertical shaft 136 and is secured thereto at 138. The governor 137 through the slidably mounted collar 139 operates a bell crank 140, pivoted at 141 to a standard 142, by being connected to the arm 143 at 144. The other arm 145 of the bell crank operates, through a link 146, a sliding rack 147 mounted in a guide bracket 148. The rack 147 is in driving engagement with the spur gear 121 which operates the variable speed gear controlling shaft 120.

The operation of this form of control will now be described. The speed of the driven shaft 124 of the variable speed gear 119 as noted above, depends upon the setting of the control shaft 120. Any variation desired from the original setting may be caused by a change in the setting of the control shaft 120 which, if rotated in one direction will cause a gradual increase in speed and will likewise cause a decrease in speed when rotated in the other direction. The governor 137 being controlled directly by the speed of the ram 27 during its forward operating movement, through connection with the crosshead 23, operates either faster or slower, as the conditions of extrusion change, which, due to the operation of the governor 137, will raise or lower the collar 139 and therefore rock the bell crank 140, which by means of the link 146 shifts the rack 147 and rotates the control gear 121 in the required direction. In this manner the speed of the table 75 is controlled in proper relation to the extruding movement of the ram, and therefore the winder will wind up the extruded rod into a coil as rapidly as the same is discharged.

The modification of the winding device illustrated in Fig. 16 and Fig. 17, comprises an electric motor 150, provided with a gear 151 upon its armature shaft. The gear 151 is in mesh with a gear 152, secured upon a horizontal shaft 153, suitably supported in a frame member 154. A friction driving wheel 155 is slidably keyed upon the shaft 153 and urged toward the periphery of a friction driven wheel 156, which is secured to the shaft 86 carrying the table 75, by means of a spring 157. The spring 157 abuts the driving wheel 155 at one end and is in abutment with a tension regulating collar 158 at the other end. The collar 158 is in threaded engagement with a threaded portion 159 of the shaft 153 and by being rotated thereon either increases or decreases the tension upon the spring 157, and therefore the friction between the friction wheels 155 and 156. An adjustable driving control is thus provided for the table 75, the friction wheels slipping in case the pull upon the extruded rod becomes in excess of the desired amount, as controlled by the setting of the tension regulating collar 158.

As will be obvious from the above description of the various forms of winding mechanism illustrated in Figs. 1, 2, 8, and 12 to 17, inclusive, these devices are not provided with means to positively grip the wire or rod as it emerges from the die after being extruded therefrom. Thus, there is a possibility of the wire or rod slipping slightly should these devices be set or adjusted so as to create an appreciably greater pull than is necessary to accomplish the result contemplated of rapidly carrying away the wire or rod from the die by taking up the slack and keeping the same taut while winding the same into a coil. The device illustrated in Figs. 18 to 20, inclusive, however, includes such a positive gripping feature and by using such a mechanism the wire or rod may be uniformly stretched in an effective manner, after leaving the die, and before being wound into a coil, and inasmuch as means is provided to positively grip the wire or rod added power may be applied without the possibility that uneven reduction of diameter will take place due to possible slippage. This device also is capable of more evenly retaining the individual coils of wire or rod upon its periphery thereby avoiding any possible surface distortion.

The device illustrated in Figs. 18 to 20, inclusive, consists of a motor driven drum 165, mounted upon a shaft 166 which is rotatable in a standard 167. The shaft 166 is connected to the driven side 168 of a friction clutch 169 which is operated through suitable belt and pulley connections 170 by a motor 171. The clutch 169 is preferably regulable so that any predetermined pull may be developed by the drum 165 when it is operably connected to the motor 171.

The drum may be of a construction as described in Patent No. 812,709 issued to W. R. Webster, February 13, 1906, which form of construction is illustrated in Figs. 18 to 20, inclusive. This form of drum consists generally of a cylindrical sleeve 172 freely rotatable upon the shaft 166. This sleeve is provided with an opening 173 in its periphery to allow the entrance of the end of an extruded rod or wire. Mounted within the sleeve 172 and secured upon the shaft 166 for rotation therewith, is a wheel 174 having a plurality of gripping surfaces 175 upon its periphery. These surfaces are in close enough proximity to the internal periphery 176 of the sleeve 172, so that when a wire or rod is inserted through the opening 173 it will be firmly gripped therebetween. This action will cause the sleeve 172 to be operatively connected to the shaft 166 whereby the wire or rod will be wound thereon into a coil. The remaining portion 177 of the drum 165 is a continuation of the sleeve 172, though not connected thereto, in order to provide the required amount of surface necessary for the amount of wire to be wound thereon. The additional portion 177 is keyed to the shaft 166, rotating therewith and assists the gripping means in its action of holding the wire by means of friction caused by the wound up wire or rod thereon. This portion is slightly tapered to facilitate the removal of the coil therefrom.

With the exception as noted above, the operation of this device is similar to the above previously described forms of winder. The extruded rod or wire is fed to the drum 165 and an end thereof is inserted through the opening 173 in the sleeve 172 where it is gripped as above described and subsequently wound into a coil. By adjusting the clutch 169 so that a predetermined amount of pull upon the wire or rod will be obtained, the wire or rod will be stretched after it leaves the die and before it is wound into a coil.

It is obvious, therefore, that with any of the above adjustable controls described in connection with the other forms of winders, this particular device will be accurately controlled and also develop a constant and uniform pull. In a machine of the character, as above described, including in its structure devices that control the speed of a winding mechanism in conjunction with the speed of the extrusion ram and in which the reduction in diameter between the billet and the rod is caused by the combination of the extruding action, and a subsequent stretching of the rod between the extrusion die and the winding mechanism, it has been found that the final diameter of the rod is in direct proportion to the diameter of the unextruded billet in accordance with the speed ratio between the winding mechanism and the extrusion ram. This feature is particularly advantageous inasmuch as the operator may readily determine the proper setting for the controlling device directly from the known factors of ram speed, billet diameter and the finally required diameter of the rod, so that the winding mechanism will be operated at the proper speed and develop the necessary pull to obtain a rod of the predetermined diameter.

A mechanism such as last described, when recently operated, reduced a rod from .400 in diameter to .280 in diameter between the die and the coiling device, which reduction was uniform throughout the length of wire or rod, with the exception of a small and negligible section closely adjacent the winder which had cooled beyond the point where stretching could take place.

Fig. 21 illustrates another method of accomplishing the same result, that is, of further reducing the diameter of the extruded rod or wire after it has been discharged from the extrusion die. A similar form of winder to that shown in Figs. 18 to 20, is used to create a constant and uniform pull upon the wire or rod, which winder is likewise provided with positive gripping means. However, in this arrangement, no appreciable stretching takes place but the wire or rod is reduced in diameter by being drawn through another die or between rolls while still in a more or less semi-plastic condition and before it is wound into a coil. The device for effecting such reduction in diameter is mounted between the extrusion die and the winder. A reducing die for this purpose is shown at 180 in Fig. 21, the rod 181 as it is discharged from the extrusion die being fed into one side of the die and drawn through the same by the action of the winding drum 165. As the wire or rod emerges from this reducing mechanism, it will be wound upon the drum 165 into a coil as above described. In many cases, a reduction in the cost of manufacture of small diameter rod or wire results from the use of such diameter-reducing means and methods, which obviously eliminates the necessity of a subsequent operation of rolling.

While I have shown and described some preferred embodiments of my invention, it will be understood that the same is not limited to the exact details shown but is capable of many modifications and variations which will lie within the spirit of the invention and the scope of the appended claims

What I claim is:

1. In a machine of the character described, means to extrude a rod from a billet, in combination with automatic power-operated means in line with the discharge of said extruding means to grasp and carry away the rod as the same is discharged from the extruding means.

2. In a machine of the character described, means to extrude a rod from a billet, in combination with automatic power-driven means in line with the discharge of said extruding means, self-acting to seize and pull upon and collect the rod as the rod is being extruded.

3. In an extrusion machine, the combination with extruding means including a billet container having a die, and a ram to cooperate with said container, of automatic means in alinement with the die to engage the end of the rod being extruded out of said die and to move the rod portion issuing from the die rectilinearly away from the die as fast as said rod is being extruded, power means for operating said last-mentioned means, and controlling means for said power means whereby the speed of movement of said rod engaging and moving means is varied.

4. In a machine of the character described, means to extrude a rod from a billet, in combination with automatic power operated means in line with the discharge of said extruding means to grasp and move the extruded rod portion issuing from the discharge rectilinearly away from the discharge end of the extruding means as fast as the rod is extruded.

5. In a machine of the character described, means to extrude a rod from a billet, in combination with power operated collecting means to engage the rod and move the extruded rod portion issuing from the extruding means away from the discharge end of the extruding means as the rod is being extruded, and a speed controlling device for said collecting means automatically controlled by the extruding speed.

6. In a machine of the character described, means to extrude a rod from a billet, in combination with automatically operable means to grip and move the rod rectilinearly away from the discharge end of the extruding means as the same is being extruded therefrom, and means for guiding the rod to said gripping and moving means.

7. In a machine of the character described, means to extrude a rod from a billet, in combination with automatic power driven means alined with the discharge of said extruding means to wind the rod into a coil as the same is discharged from the first means, said last means including in its structure a rotatable disk-like member adapted to seize the rod as it is extruded.

8. In a machine of the character described, means to extrude a rod from a billet, in combination with power driven means to grippingly engage and wind the rod into a coil as the same is extruded from the extruding means and controlling means for said power driven winding means whereby the speed of winding is proportional to the extruding speed of the rod.

9. In a machine of the character described, means to extrude a rod from a billet, in combination with power driven means to wind the rod in an untwisted condition into a coil as the same is discharged from the extruding means, and means controlled by the extruding speed of the rod to vary the winding speed of said winding means.

10. In a machine of the character described, means to extrude a rod from a billet, in combination with power actuated means controllable by and alined with the discharge of said extruding means to wind the rod in an untwisted condition into a coil as the same is discharged therefrom.

11. In a metal extruding machine, adapted to extrude a rod from a billet, a rotating mechanism for gripping the rod automatically as it is extruded, and winding the same into a coil, and controlling means for said mechanism whereby a constant and uniform pull is maintained thereby upon the rod.

12. In a metal extruding machine, mechanism adapted to extrude a rod of comparatively small diameter from a billet of comparatively large diameter, mechanism for engaging the rod as it is extruded and winding the same into a coil, and means to control the action of said engaging and winding mechanism by the action of said extruding mechanism.

13. In a metal extruding machine having means to extrude the metal contained in a billet through an opening in a die, automatic means to grip the extruded rod and to wind the same into a coil while maintaining a uniform pull upon the rod as it is being extruded.

14. In a metal extruding machine, means to extrude a rod from a billet, means to seize and wind the rod as it is extruded into a coil, and means to cut off the extruded rod from the remaining stump of the billet when the extrusion operation is completed and while the winding means is in operation to insure the winding of the entire extruded rod into a coil.

15. In a metal extruding machine, means to extrude a rod from a billet, means to engage and wind the extruded rod into a coil, means to guide the extruded rod toward said winding means, and means to cut off the extruded rod from the remaining stump of the billet while the winding means is in operation to insure the winding of the entire extruded rod into a coil.

16. In a metal extruding machine, means to extrude a rod from a billet, means to engage and wind the rod while being extruded into a coil, means to guide the extruded rod toward said winding means, and means providing for the severance of the extruded rod from the remainder of the billet when the extrusion operation is completed, said engaging and winding means being adapted to produce a uniform pull upon the rod during the extruding operation.

17. In combination with an extrusion machine, having means to extrude a rod from a billet, a winding mechanism for winding the extruded rod into a coil, said winding mechanism being constructed to vary in speed while maintaining a constant pull upon the rod as it is being extruded.

18. In an extrusion machine, extruding means operating upon a billet to force the material thereof through the opening in a die whereby a rod of comparatively small diameter is extruded, means to engage and wind into a coil the extruded rod as rapidly as the same is discharged from the die, said winding means being controlled by said extruding means to cause a uniform pull to be exerted upon the rod as it is being extruded.

19. In an extrusion machine, extruding means operating upon a billet to force the material thereof through the opening in a die whereby a rod of comparatively small diameter is extruded, means to engage and wind into a coil the extruded rod as rapidly as the same is discharged from the die, said winding means being controlled by said extruding means to cause a uniform pull to be exerted upon the rod as it is being extruded, and means to cut off the extruded rod from the remaining stump of the billet after the extrusion operation is completed and while the winding means is in operation.

20. An extrusion machine comprising means to receive a billet of metal, means to force the metal of said billet through the opening in a die to form a rod, means to engage and wind the rod as it is extruded into a coil, said winding means being automatically operable to maintain a constant and uniform pull upon the rod while the same is being extruded.

21. An extrusion machine comprising means to receive a billet of metal, means to force the metal of said billet through the opening in a die to form a rod, means to engage and wind the rod as it is extruded into a coil, said winding means automatically operable to maintain a constant and uniform pull upon the rod while the same is being extruded, and means to control the automatic operation thereof being controlled by the rate of movement of said metal forcing means.

22. An extrusion machine of the character described, including a billet container having a die provided with an opening, adjacent an end thereof, a ram, said ram being movable relatively to said billet container whereby the material in the billet is extruded through the opening in said die, a vertically movable block for retaining the die in position, and means movable with said block across the path of the extruded material to sever the same at a point beyond the die.

23. In an extrusion machine, a movable ram, a billet container, a die holder, a die in said die holder having an opening therein, said die holder being adapted to carry the die toward and away from an end of said billet container, a backing block vertically movable into and out of position whereby said die holder is forced toward said container to retain said die against the end thereof, means to move said ram against a billet of metal within said container to cause the material thereof to be extruded through the opening in said die, and rod severing means connected to said backing block to sever an extruded rod from said billet when the backing block is vertically moved in one direction to release said die from engagement with said container.

24. In an extrusion machine, a billet container having a bore, a ram adapted to enter the bore in said billet container, one of said parts being movable relatively to the other, a movable die holder provided with a die having an opening therethrough, means to move said die holder whereby said die is caused to close one end of the bore in said billet container, vertically movable means to lock said die in container bore closing position, a member having a cutting edge provided in said die holder, means having a cutting edge and connected to and movable with said die locking means to cooperate with said member to shear the extruded product simultaneously with the movement of said locking means in die releasing direction, and means to cause relative movement between said ram and said container to force said ram against a billet of metal in said container whereby the material thereof is extruded through the opening in said die and between said cutting edges.

25. In combination with an extrusion machine provided with a movable ram, a billet container, a die at one end of said container, means to operate said ram to act upon a billet of metal within said container to force the metal thereof through a die to form a rod, means to retain said die in position, means associated with said die retaining means to sever the extruded rod when the required amount has been extruded, and means to collect and wind the extruded rod in its entirety into a coil as the same is being extruded and after it has been severed.

26. In an extrusion machine, a movable ram, a billet container, a die at one end of said container, means to operate said ram to act upon a billet of metal within said container to force the metal thereof through said die to form a rod, and means to seize and to wind the extruded rod into a coil during the extruding operation.

27. In an extrusion machine, a movable ram, a billet container, a die at one end of said container, means to operate said ram to act upon a billet of metal within said container to force the metal thereof through said die to form a rod, means to wind the extruded rod into a coil, said ram operating means controlling said winding means to cause the same to produce a uniform pull upon the extruded rod, as the same is being extruded.

28. In a machine of the character described, means to extrude a rod from a billet in combination with means to wind the extruded rod into a coil as the same is discharged from the extruding means, said winding means comprising a rotatable rod engaging mechanism operated by a variable speed electric motor, and controlling means for said motor comprising an automatically operated field rheostat short circuiting device.

29. In a machine of the character described, means to extrude a rod from a billet in combination with means to wind the extruded rod into a coil as the same is discharged from the extruding means, said winding means comprising a rotatable rod engaging mechanism operated by an electric motor, control means for said motor comprising a field rheostat short circuiting means, and means controlled by the amount of the electrical current in the armature of said motor for causing said field rheostat short circuiting means to be operably inserted in the field circuit of said motor.

30. In a machine of the character described, means to extrude a rod from a billet in combination with means to wind the extruded rod into a coil as the same is discharged from the extruding means, said winding means comprising a rotatable rod engaging mechanism operated by an electric motor, control means for said motor comprising a field rheostat short circuiting means, means controlled by the amount of current in the armature of said motor for causing said field rheostat short circuiting means to be operably inserted in the field circuit of said motor, and means for varying the action of the current in said armature.

31. In a machine of the character described, means to extrude a rod from a billet in combination with means to wind the extruded rod into a coil as the same is discharged from the extruding means, said winding means comprising a power operated rotatable rod engaging mechanism, said rod engaging mechanism being adapted to positively grip the end of the extruded rod and to draw the extruded rod away from said extruding means with sufficient force to cause uniform stretching thereof, whereby the extruded rod is reduced in diameter after being extruded and before winding.

32. In a machine of the character described, means to extrude a rod from a billet in combination with means to wind the extruded rod into a coil as the same is discharged from the extruding means, said winding means comprising a power operated rotatable rod engaging mechanism, and rod diameter reducing means intermediate the extruding means and the rod engaging mechanism, through which the rod passes before being engaged by said engaging mechanism.

33. In a machine of the character described, means to extrude a rod from a billet in combination with means to wind the extruded rod into a coil as the same is discharged from the extruding means, said winding means comprising a rotatable rod engaging mechanism, and means for reducing the diameter of the extruded rod disposed intermediate the extruding means and the engaging means, and power driven means for operating said rod engaging means to cause the same to draw the extruded rod through the rod reducing means as rapidly as the rod is extruded.

34. The method of producing a comparatively small diameter rod from a heated billet of comparatively large diameter, which consists of forcing the metal contained in said billet through an opening in a suitable die structure, seizing the rod as the same emerges from the opening and winding the same into a coil while maintaining a tension thereon.

35. The method of producing a comparatively small diameter rod from a heated billet of comparatively large diameter, which consists of forcing the metal contained in said billet through an opening in a suitable die structure, engaging the rod as the same emerges from the opening, winding the same into a coil while stretching the extruded rod to cause a uniform reduction in diameter.

36. The method of producing a comparatively small diameter rod from a billet of comparatively large diameter, which consists of forcing the metal contained in said billet through an opening in a suitable die structure, engaging the extruded rod as the same emerges from the opening, drawing the rod through a reducing die while the rod is being extruded and then winding the same into a coil while maintaining a tension thereon.

37. The method of producing a comparatively small diameter rod from a billet of comparatively large diameter, which consists of forcing the metal contained in said billet through an opening in a suitable die structure, engaging the extruded rod as the same emerges from the opening, applying sufficient pull upon the extruded rod to uniformly stretch the same and thereby reduce its diameter, and then winding the same into a coil.

38. In a machine of the character described, extruding means, winding means, and control means adapted to pull upon the extruded product for the winding means operated by the extruding means.

39. In a machine of the character described, means for extruding a metal billet, and automatically controlled pulling means for winding the extruded product in consonance with the extruding speed.

40. In a machine of the character described, extruding means, winding means, and controlling means connecting said two means to produce a constant winding torque.

41. In a machine of the character described, extruding means, winding means, and controlling means connecting said two means to produce a constant winding torque as the extruding speed varies.

42. In a machine of the character described, billet extruding means, pulling means for winding the extruded blank, and a control device for the winding means, connected with and operated by a movable part of the extruding means.

43. In a machine of the character described, billet extruding means, pulling means for winding the extruded blank, and a control device for the winding means, connected with and operated by a movable part of the extruding means, said control device constructed to vary the winding speed automatically so as to compensate for changes in the extruding speed.

44. In an organized machine of the character described, the combination of means to extrude a billet into an attenuated blank, and means for seizing and collecting the blank from the extruding means and effecting a further reduction in the diameter thereof.

45. In an organized machine of the character described, the combination of means to extrude a billet into an attenuated blank, and means for receiving the blank from the extruding means and stretching the blank to effect a further reduction in the diameter thereof.

46. In a machine of the character described, the combination of means to extrude a billet into an attenuated blank, and means for receiving the blank from the extruding means and uniformly stretching the blank to further and uniformly reduce the diameter over the length thereof.

47. In a machine of the character described, billet extruding means whereby the product is smaller in diameter than the billet, automatically operating means for winding the extruded product as it is discharged from said first means, and means operating to further reduce the diameter of said product after it leaves the extruding die, said last named means including a reducing device interposed between the winding means and the extruding die.

48. In an extrusion machine, means to extrude a rod from the billet, including a die through which the rod is extruded, and means to support said die in operative position, said means vertically movable to die releasing position and provided with means to sever the extruded rod from the unextruded billet.

49. In an extrusion machine, means to extrude a rod from a billet, including a die through which the rod is extruded, and vertically movable means to support the die in operative position during the extrusion operation, said die supporting means being provided with means to sever the extruded rod from the unextruded remainder of said billet, said severing means operating when said supporting means is moved to a die releasing position.

50. In a machine of the character described, means to produce an attenuated blank of a required diameter from a billet of known diameter, said means including a movable ram having a known velocity during the extruding operation, and a die through which the billet is extruded, means for engaging the blank as it is extruded and to draw the same away from said die, and means controlling said rod engaging and carrying away means so that the speed of the carrying away means is proportional to the ram speed in accordance with the ratio between the billet diameter and the required diameter of the blank.

51. In a machine of the character described, means to form an attenuated rod of uniform density and diameter from a semi-molten billet of metal, comprising a billet container, a ram adapted to force the metal of the billet out of said container and through an opening in a die, means to pull the extruded rod away from the die, and means controlled by the ram operatively connected to the pulling means whereby the movement of the same is proportional to the flow of the metal being extruded.

In witness whereof, I have hereunto set my hand this 29 day of April, 1924.

WALTER R. CLARK.

CERTIFICATE OF CORRECTION.

Patent No. 1,769,205.   Granted July 1, 1930, to

WALTER R. CLARK.

It is hereby certified that error appears in the printed specification of the above numbered patent requiring correction as follows: Page 1, line 89, for the article "the" read "this"; page 8, line 112, claim 19, for the misspelled word "clut" read "cut"; page 9, line 4, claim 21, strike out the words "being controlled"; page 10, lines 86 and 87, claim 38, strike out the words "adapted to pull upon the extruded product" and insert the same to follow after the word "means" second occurrence, line 85; and that the said Letters Patent should be read with these corrections therein that the same may conform to the record of the case in the Patent Office.

Signed and sealed this 5th day of August, A. D. 1930.

(Seal)

Wm. A. Kinnan,
Acting Commissioner of Patents.